United States Patent
Kingsbury et al.

(10) Patent No.: US 10,496,882 B2
(45) Date of Patent: Dec. 3, 2019

(54) CODED OCULAR LENS FOR IDENTIFICATION

(71) Applicant: Lenovo (Singapore) Pte. Ltd., Singapore (SG)

(72) Inventors: Timothy Winthrop Kingsbury, Cary, NC (US); Rod D. Waltermann, Rougemont, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 204 days.

(21) Appl. No.: 15/243,277

(22) Filed: Aug. 22, 2016

(65) Prior Publication Data

US 2018/0053050 A1 Feb. 22, 2018

(51) Int. Cl.
| | |
|---|---|
| G06K 9/00 | (2006.01) |
| G06F 21/32 | (2013.01) |
| G06K 19/06 | (2006.01) |
| G02C 7/02 | (2006.01) |

(52) U.S. Cl.
CPC ......... *G06K 9/00604* (2013.01); *G06F 21/32* (2013.01); *G06K 9/00617* (2013.01); *G06K 19/06028* (2013.01); *G02C 7/021* (2013.01); *G06K 2209/27* (2013.01)

(58) Field of Classification Search
CPC ......... G06K 9/00604; G06K 19/06028; G06K 9/00617; G06F 21/32; G02C 7/021
USPC ....... 382/100, 117, 128, 190, 181, 195, 276, 382/287, 305, 140, 151; 351/41, 159, 1, 351/2, 159.01; 623/6.1, 6.17, 6.27, 6.35; 250/330; 359/362, 480; 514/839, 840
See application file for complete search history.

(56) References Cited

U.S. PATENT DOCUMENTS

| | | | | |
|---|---|---|---|---|
| 5,861,114 | A * | 1/1999 | Roffman | B29C 33/306 264/1.1 |
| 6,017,121 | A * | 1/2000 | Chateau | G02C 7/028 351/159.01 |
| 6,811,805 | B2 * | 11/2004 | Gilliard | B29D 11/00317 427/164 |
| 6,948,815 | B2 * | 9/2005 | Neuberger | G02C 7/021 351/159.29 |
| 9,086,582 | B1 * | 7/2015 | Barton | G02C 13/005 |
| 9,241,620 | B1 * | 1/2016 | Kockan | A61B 3/0033 |
| 9,568,603 | B2 * | 2/2017 | Yahav | G01S 17/06 |
| 2005/0073648 | A1 * | 4/2005 | Toshima | A61B 3/10 351/200 |
| 2011/0089585 | A1 * | 4/2011 | Biel | B29D 11/00259 264/1.1 |
| 2011/0316847 | A1 * | 12/2011 | Cheng | G02B 27/2264 345/419 |
| 2013/0339043 | A1 * | 12/2013 | Bakar | A61B 3/185 705/2 |
| 2017/0061647 | A1 * | 3/2017 | Starner | G06T 7/60 |
| 2017/0083909 | A1 * | 3/2017 | Mork | G06Q 20/401 |

FOREIGN PATENT DOCUMENTS

JP 20022779402 * 9/2002

* cited by examiner

*Primary Examiner* — Sheela C Chawan
(74) *Attorney, Agent, or Firm* — Ference & Associates LLC

(57) ABSTRACT

One embodiment provides a method, including: obtaining, using an imaging device, user image data comprising an ocular lens having a code; and identifying, using a processor, a user based on the user image data. Other aspects are described and claimed.

12 Claims, 4 Drawing Sheets

CODED OCULAR LENS FOR IDENTIFICATION

BACKGROUND

Eye scanning (e.g., iris or retina scanning) may be used to perform biometric identification of individuals. Such biometric techniques use biologically determined differences, e.g., differences in iris structural composition and character, to distinguish individuals. Systems typically utilize imaging of some kind, either passively collected (e.g., still or video image data collected using a standard camera) or actively collected (e.g., transmitted light reflections that are collected) to determine the differences for use in biometric identification. Other features of the eye, e.g., blood vessel location and character, may also be utilized for biometric identification.

BRIEF SUMMARY

In summary, one aspect provides a method, comprising: obtaining, using an imaging device, user image data comprising an ocular lens having a code; and identifying, using a processor, a user based on the user image data.

Another aspect provides an ocular lens, comprising: a code detectable by imaging that is associated with a user.

A further aspect provides a system, comprising: a storage device comprising a plurality of ocular lens codes that are associated with one or more users; a communication device that communicates data over a network; and a processor that: receives a request associated with at least one of the plurality of ocular lens codes; and responds to the request by communicating, over the network, an association between a user and the at least one of the plurality of ocular lens codes.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
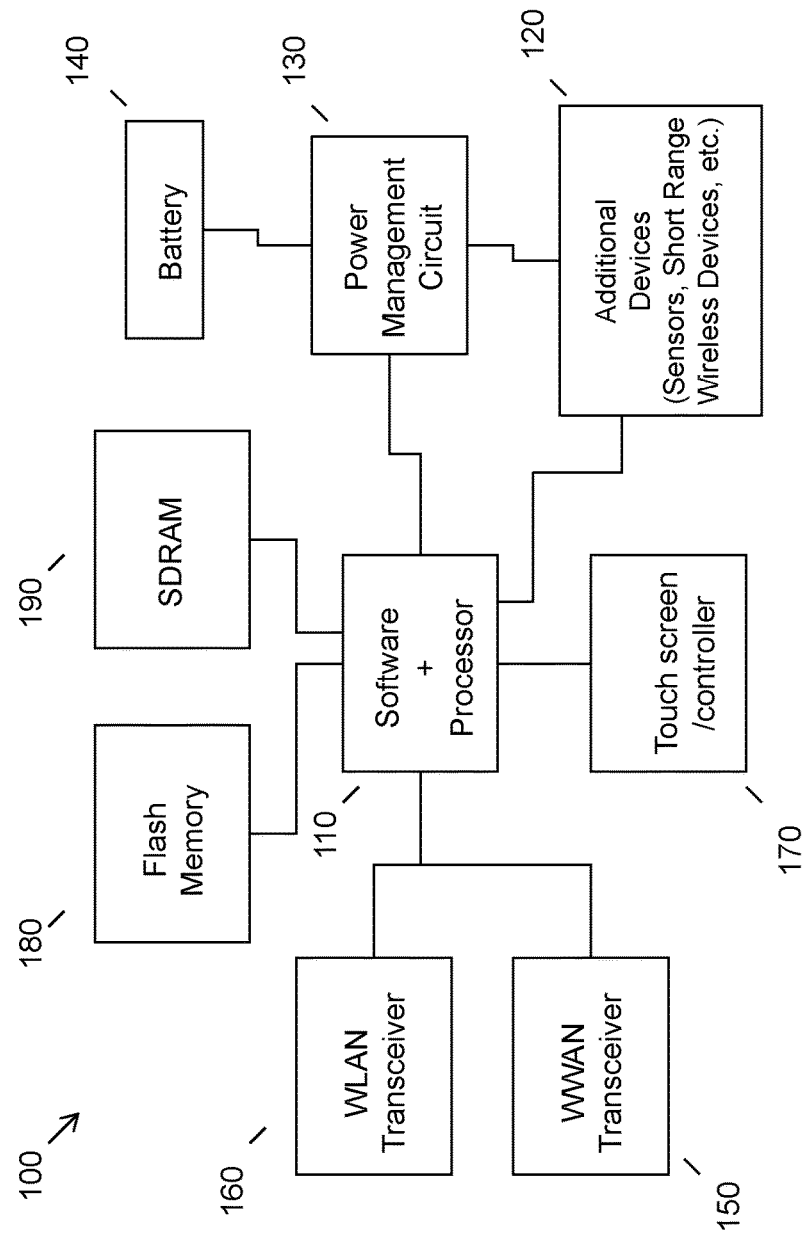
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

Common biometric eye scanning techniques such as retina or iris scanning have problems. For example, the scanner can be tricked with a high resolution image, it is inconvenient if a close-up scan of the eye is required, a loss of accuracy is realized if the eye is injured in some way, the same image of the eye is typically used, even for different login scenarios, there is a risk of false positives or false negatives, there is a risk of the image being used for other purposes (e.g., privacy of the user is at issue), and if the biometric data is compromised, it cannot be changed.

An embodiment provides an alternative method of eye scanning that relies upon ocular lenses, i.e., contact lenses or eyeglass lenses. A code that may be used as the user's identification is placed onto the surface of, or embedded into, the lens(es). Lenses may be marked or coded using a variety of techniques, including for example physical etching or light reflective coatings or embedded elements, each of which may only be visible in specific spectrums, such as infrared.

The code of information on the lens may be presented in a variety of readable formats, including for example plain text or machine readable values such as QR codes or bar codes.

The user can change the len(es) to change the code. For example, a box of contact lenses may contain different security codes, e.g., on packaging for each lens or lens pair. Thus, the user may cycle the security information as needed. The security information on the lenses could be predefined, e.g., by the contact lens manufacturer, added by a third party, or given sufficient equipment, imprinted by the user.

The code of the lens(es) is associated with the user in a variety of ways. For example, the user may locally associate the code with himself or herself, e.g., by entry of the code locally at his or her computing device as part of a login set up. Alternatively, the user may indicate an indirect association with the code of the len(es), e.g., the user may indicate that a certain manufacturer produces the lenses that user wears, where the code of the len(es) is associated with the manufacturer. This permits identification of a type of lens(es) worn by the user, and use of this information as part of an authentication process.

Further, a repository (e.g., remote server) may include associations between lenses and users, such that a code received locally may be verified by reference to previously stored associations between lens codes and users, either obtained in real time or obtained ahead of time.

The illustrated example embodiments will be best understood by reference to the figures. The following description is intended only by way of example, and simply illustrates certain example embodiments.

While various other circuits, circuitry or components may be utilized in information handling devices, with regard to mobile device circuitry 100, an example illustrated in FIG. 1 includes a system on a chip design found for example in many smaller or mobile computing platforms. Software and processor(s) are combined in a single chip 110. Processors comprise internal arithmetic units, registers, cache memory, busses, I/O ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additionally, devices 120 are commonly included and may be added based on a particular design. For example, additional devices 120 may include a sensor or sensor(s), for example an optical sensor such as a camera and/or other imaging device, e.g., an infrared sensor, etc., as well as short range wireless devices, e.g., BLUETOOTH wireless communication devices. System 100 often includes a touch screen 170 for data input and display/rendering. System 100 also typically includes various memory devices, for example flash memory 180 and SDRAM 190.

Figure 2:
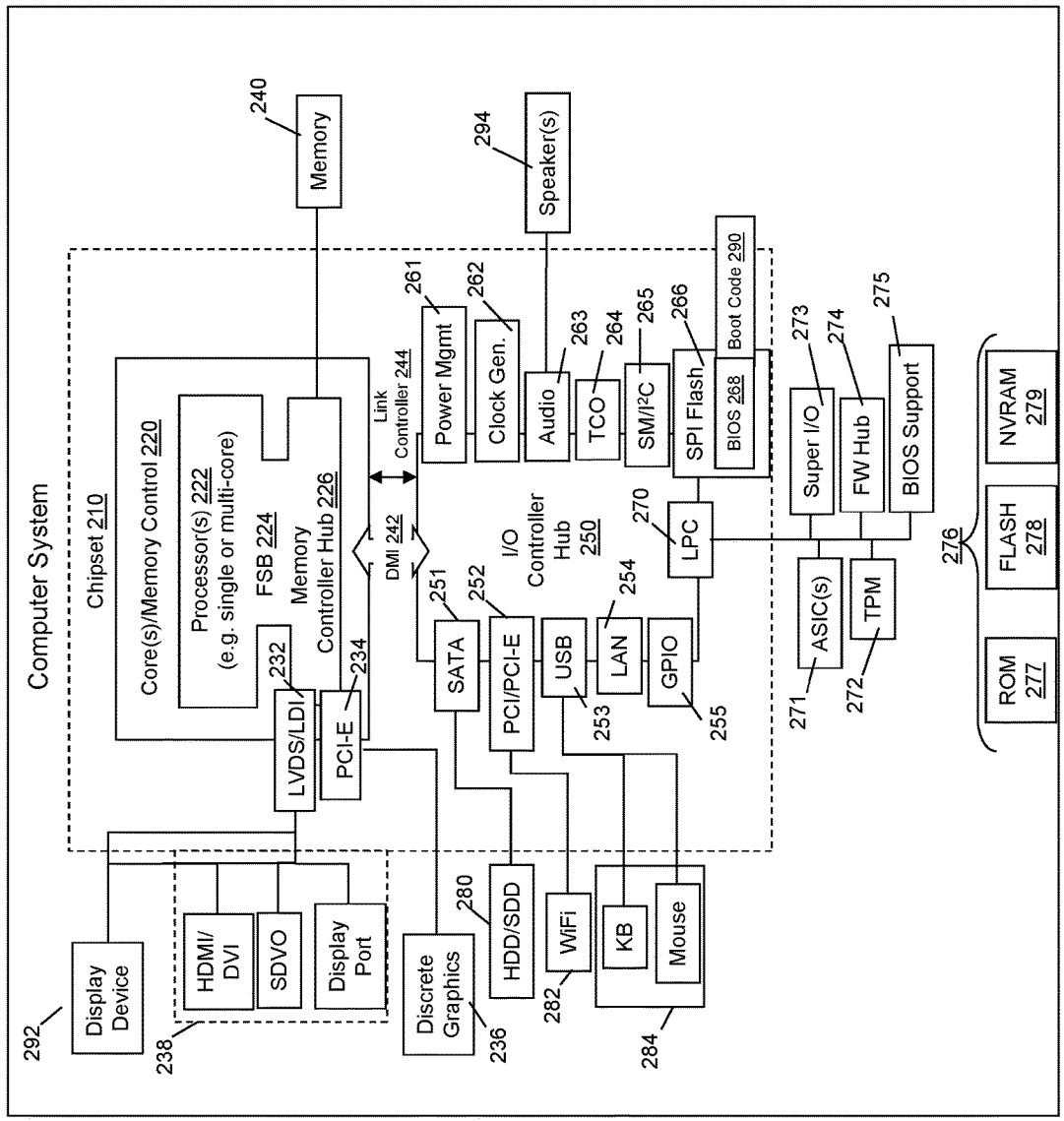
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a low voltage differential signaling (LVDS) interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, biometric data capture device, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices such as a computing device that obtains user image data including a coded lens and uses the same to conduct identification of a user. For example, the circuitry outlined in FIG. 1 might be included in a mobile computing device of a user, where inputs from a camera are analyzed to identify a code included in a lens worn by the user to perform identification. As another example, the circuitry outlined in FIG. 2 might be included in a desktop or laptop computer that obtains user image data using an integrated or operatively connected camera to capture an image of the coded lens, identify the code contained therein, and perform identification of the user. As will be appreciated by reviewing this description, other types of devices may be utilized. For example, the circuitry outlined in FIG. 1 and/or FIG. 2 may be included in a remote server, where user image data is sent to the remote server for identification, or where the remote server stores codes and an association with user identification data, as further described herein.

Figure 3:
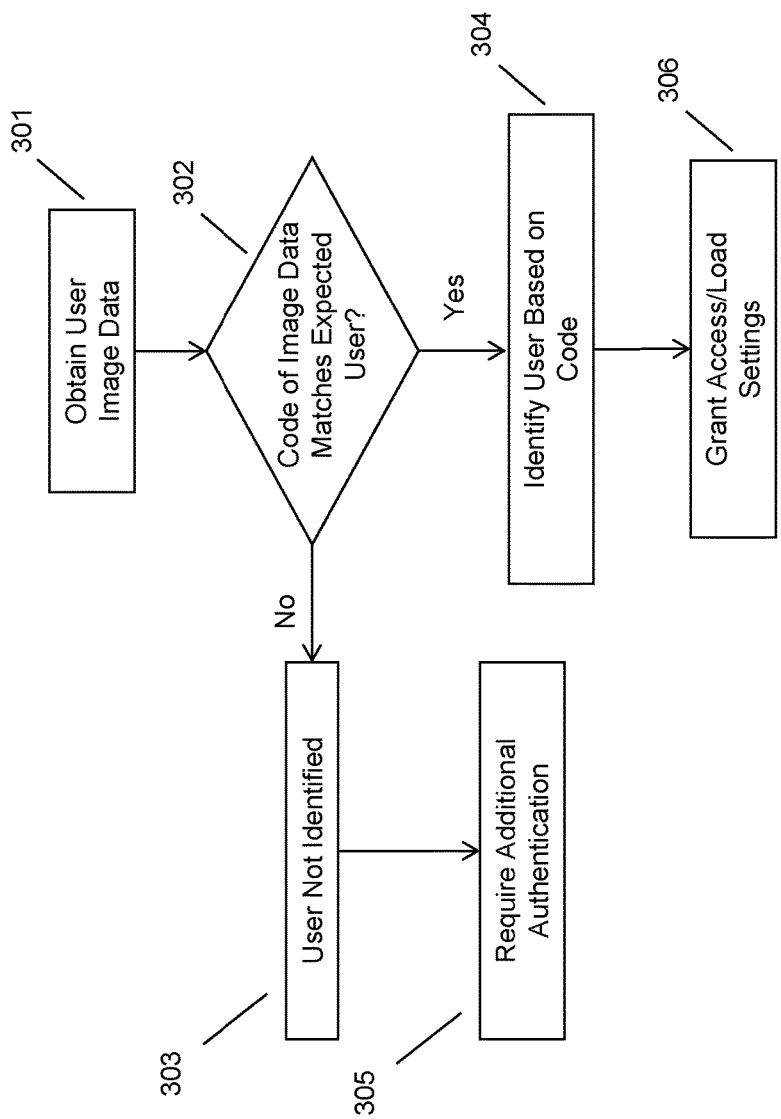
FIG. 3 illustrates an example method of identification using an ocular lens.

Turning to FIG. 3, an embodiment obtains user image data, e.g., using a camera of a user device, at 301. The user image data may include data permitting identification of a code included in a lens or lenses worn by the user.

The information coded on the lens or lenses worn by the user may take a variety of forms. For example, a code that may be used as the user's identification is placed onto the surface of, or embedded into, the lens or lenses. Lenses may be marked or coded using a variety of techniques, including for example physical etching of the surface of the lens, or light reflective coatings applied to the surface of the lens, or a material (e.g., a light reflecting or absorbing material) may be embedded within the lens or lenses. Each such code, e.g., a surface coding, an embedded material, etc., may only be visible in specific spectrums, such as infrared.

The user image data obtained at 301 is processed to determine if the user is wearing a coded lens or lenses that match an expected code, as illustrated at 302. That is, the user image data obtained at 301 is processed to automatically extract the code included in the lens or lenses. The image analysis may include identifying the user's eyes within the image, followed by examining an area within the image associated with the user's eyes to identify coded information, e.g., as determined by examining the pixels of the image data.

Once the code is extracted from the image, it is compared to known user code data at 302, e.g., a code previously associated with a particular user, in order to identify if the code derived from the image of the user, and particularly of the user's lens or lenses, matches an expected code. In an embodiment, the comparison and determination performed at 302 may be conducted locally on the user's device or may be conducted in connection with a remote device, such as a server that supplies known or expected codes for particular users and/or performs image analysis to identify a code or codes in the user image data. Thus, the known or expected user code data may be stored locally or accessed from a remote device.

If the user is identified, as illustrated at 304, using the user image data obtained at 301, i.e., the currently detected user image data contains a code associated with a known user, the user may be granted access to a device, have continued access to a device, or have particular settings (e.g., user-specific or customized settings) loaded, as illustrated at 306. Otherwise, i.e., if a user is not identified at 302, as illustrated at 303, the lack of user identification may lead to a requirement for further authentication data, as illustrated at 305, and/or may result in reduced device functionality.

Figure 4:
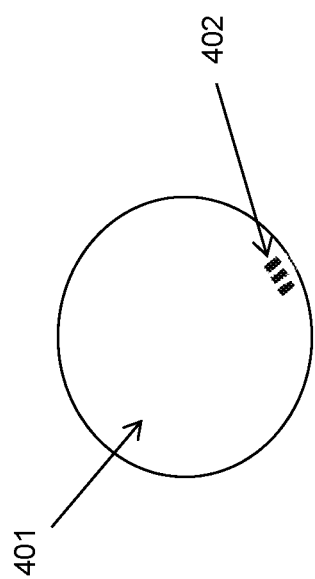
FIG. 4 illustrates an example ocular lens.

Turning to FIG. 4, an example of an ocular lens 401 is provided. As described herein, the ocular lens 401 may be a contact lens worn on the user's eye or may include a lens worn in a pair of eyeglasses. In the non-limiting example of a contact lens worn on the user's eye, the ocular lens 401 may be formed of or include a hydrogel or other material used for wearable ocular lenses. The ocular lens 401 comprises a code 402, either a full code or a partial code that may be combined with a paired lens to form a full code.

The code 402 may comprise information in the form of plain text or machine readable information, e.g., a bar code or the like. In an embodiment, the code 402 is provided by including a printed layer on the surface of the ocular lens 401. In an embodiment, the code 402 is provided by embedding a material within the ocular lens 401.

The code 402 may be provided by a material that is visible in the visible light spectrum. If a visible code 402 is provided, it may be located at an outer periphery of the ocular lens 401, as illustrated in FIG. 4.

The code 402 may be provided by a material that is not visible in the visible light spectrum, but is rather visible by excitation or reflection in response to a frequency and/or intensity of light that is predetermined, e.g., an infrared responsive material. In this case, the code 402 may be located in other areas of the ocular lens 401 so long as the code 402 material does not materially alter the optical character of the optical lens 401.

The code 402 may be provided may a material that reflects visible light or light of another frequency and/or intensity, e.g., light transmitted towards the ocular lens from a transmission source, e.g., an iris reader, a retinal reader, etc.

Further, in an embodiment, the code 402 may comprise a complete code, i.e., permitting user identification on its own. In the alternative, the code 402 may comprise a partial code, i.e., one that must be combined with other data in order to identify a user. For example, the code 402 may be combined, e.g., through image processing or post processing, with another code included in a paired ocular lens. Moreover, the partial code 402 may be combined with other data, e.g., alphanumeric login data, gesture data, or other biometric data, e.g., fingerprint data, voice data, facial recognition data, etc.

In an embodiment, the code 402 included in the ocular lens 401 or lenses is used to identify a user, e.g., for granting access to an electronic device. For example, an embodiment provides a system including a storage device including a plurality of ocular lens codes that are associated with one or more users. The plurality of ocular lens codes may be associated with the user ahead of time, e.g., in response to a user creating the association between a code included with a box or packaging of the ocular lens. The system provides a communication device that communicates data over a network such that, in response to a request associated with at least one of the plurality of ocular lens codes, e.g., as extracted from user image data obtained at 301 of FIG. 3, a response to the request may be communicated, over the network, to indicate an association between a user and the at least one of the plurality of ocular lens codes. This request and response mechanism may be used to communicate which ocular lens code(s) are associated with a particular user. The request may be conducted ahead of time, i.e., prior to a user attempting to log in using the ocular lens code.

An embodiment therefore provides an ocular lens having a code that is used to identify a user, e.g., to log the user into a device or service. This permits the user to refresh the code as needed, whereas conventional eye scanning techniques rely on biological characteristics that cannot be changed.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
   obtaining, using an imaging device, user image data comprising an ocular lens being marked with a code, wherein the code corresponds to an identified user; and
   identifying, from the user image data and using a processor, a user based on identifying the user corresponding to the code.

2. The method of claim 1, further comprising identifying one or more eyes within the user image data;
   wherein the identifying comprises obtaining the code from an image area associated with the one or more eyes of the user.

3. The method of claim 1, further comprising granting access to an electronic device based on the identifying.

4. The method of claim 1, wherein the obtaining comprises transmitting light towards the user.

5. The method of claim 4, wherein the light is of a predetermined wavelength.

6. The method of claim 4, wherein the light is of a predetermined intensity.

7. The method of claim 1, wherein the identifying comprises communicating the user image data to another device.

8. The method of claim 7, wherein the identifying comprises receiving, from the another device, a user identification result.

9. The method of claim 1, further comprising receiving an association between the user and the code.

10. The method of claim 9, further comprising storing the association between the user and the code.

11. The method of claim 1, wherein the identifying comprises identifying the user based on the user image data and additional data selected from the group consisting of biometric data and user input data.

12. A system, comprising:
   a storage device comprising a plurality of ocular lens codes, wherein each of the plurality of ocular lens codes correspond to a code marked on an ocular lens and are associated with a user;
   a communication device that communicates data over a network; and
   a processor that:
      receives a request associated with at least one of the plurality of ocular lens codes, wherein the received request requests an identification of the user corresponding to the at least one of the plurality of ocular lens codes; and
      responds to the request by communicating, over the network, an association between a user and the at least one of the plurality of ocular lens codes, wherein the association identifies the user corresponding to the at least one of the plurality of ocular lens codes.

* * * * *